(12) United States Patent
Nakamura et al.

(10) Patent No.: US 8,145,347 B2
(45) Date of Patent: Mar. 27, 2012

(54) NUMERICAL CONTROL APPARATUS AND NUMERICAL CONTROL METHOD

(75) Inventors: Naoki Nakamura, Tokyo (JP); Tomonori Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 569 days.

(21) Appl. No.: 12/403,085

(22) Filed: Mar. 12, 2009

(65) Prior Publication Data
US 2009/0248203 A1 Oct. 1, 2009

(30) Foreign Application Priority Data
Mar. 31, 2008 (JP) ................................ 2008-090949

(51) Int. Cl.
G06F 19/00 (2006.01)
G05B 13/02 (2006.01)
G05B 19/41 (2006.01)

(52) U.S. Cl. ........ 700/160; 700/173; 700/192; 700/187; 318/560; 318/573; 318/567

(58) Field of Classification Search ................ 700/160, 700/173, 182, 190, 192, 189, 28, 187, 186, 700/63, 56, 61; 318/570, 560, 573, 567
See application file for complete search history.

(56) References Cited

U.S. PATENT DOCUMENTS

| | | | | |
|---|---|---|---|---|
| 3,748,563 A | * | 7/1973 | Pomella et al. | 318/573 |
| 5,955,856 A | * | 9/1999 | Sato et al. | 318/560 |
| 6,604,015 B2 | * | 8/2003 | Iriguchi et al. | 700/187 |
| 6,775,586 B2 | | 8/2004 | Shibata et al. | |
| 6,920,363 B2 | * | 7/2005 | Otsuki et al. | 700/63 |
| 6,922,606 B1 | * | 7/2005 | Yutkowitz | 700/187 |
| 6,999,845 B2 | * | 2/2006 | Hirai et al. | 700/189 |
| 7,194,329 B2 | * | 3/2007 | Sato et al. | 700/192 |
| 2005/0035734 A1 | | 2/2005 | Haunerdinger et al. | |

FOREIGN PATENT DOCUMENTS

| | | |
|---|---|---|
| DE | 101 49 175 A1 | 4/2003 |
| EP | 0 864 952 A1 | 9/1998 |
| JP | 6-332524 | 12/1994 |
| JP | 2005-352876 | 12/2005 |
| JP | 2006-309645 | 11/2006 |

OTHER PUBLICATIONS

Office Action issued Oct. 18, 2010, in German Patent Application No. 10 2009 013 388.7-32.

* cited by examiner

Primary Examiner — Ronnie Mancho
(74) Attorney, Agent, or Firm — Oblon, Spivak, McClelland, Maier & Neustadt, L.L.P.

(57) ABSTRACT

In a numerical control apparatus, a rotation-axis filtering processor subjects an angle change amount between interpolation points between rotation angles of a rotation axis to moving average filtering thereby smoothing the angle change amount between the interpolation points. A translation-axis timing synchronization unit subjects a moving amount between interpolation points between tool-tip positions of a translation axis to moving average filtering, to synchronize timing of rotation of the rotation axis being smoothed and timing of movement of the translation axis. A coordinate transformation unit transforms the tool-tip position into coordinates of a machine position of the translation axis according to a configuration of the machine tool, from each tool-tip position after timing synchronization between axes of the translation axis is performed and from each rotation angle of the rotation axis after being filtered.

5 Claims, 7 Drawing Sheets

NUMERICAL CONTROL APPARATUS AND NUMERICAL CONTROL METHOD

BACKGROUND OF THE INVENTION

1. Field of the Invention

The present invention relates to a technology for numerical control of a machine tool.

2. Description of the Related Art

A numerical control device is sometimes coupled to a machining apparatus. This numerical control device moves a movable portion (a machining tool) of the machining apparatus along various axes to position the movable portion at a machining position. If the machining apparatus has a translation axis and a rotation axis, more complicated machining becomes possible, because, a tool-tip position can be indicated by setting a position on the translation axis and a tool posture can be indicated by setting a rotation angle on the rotation axis. The center of rotation of the rotation axis to determine the tool posture is generally provided in a base of the tool or in a table where a workpiece is placed. Therefore, if the tool posture is changed, the tool-tip position as viewed from the workpiece is also changed. When the translation axis moves while the tool posture is changing, the movable portion of the translation axis needs to move itself by a moving amount of the tool-tip position commanded from the machining program and additionally move itself by a moving amount to correct the tool-tip position as viewed from the workpiece in association with the change of the tool posture.

Specifically, even if moving amounts of the tool-tip position per unit time commanded from the machining program are the same as each other, moving amounts of the movable portion of the translation axis differ depending on whether the tool posture is changed. Therefore, when a command to intermittently change the tool posture is included in the machining program that includes commands for the tool-tip position and the tool posture, or when a command with which a change amount of the tool posture per unit time is not smooth and discontinuous is included therein, the movable portion of the translation axis needs to be moved at a discontinuous speed to move the tool-tip position at a constant speed. However, it is difficult to move the movable portion at a discontinuous speed, and in addition, acceleration and deceleration processes are performed in the numerical control apparatus. Therefore, it is impossible to move the tool-tip position at a constant speed, which causes the accuracy of a machined surface to be degraded.

In a conventional numerical control apparatus, when the command to intermittently change a tool posture is included in a machining program, or when the command with which a change amount of a tool posture per unit time is not smooth and discontinuous is included therein, to smoothly move the tip of the tool, command points in the machining program are changed regardless of inside or outside of the numerical control apparatus. For example, when a command point sequence in the machining program is changed inside the numerical control apparatus, in a technology disclosed in Japanese Patent Application Laid-open No. 2006-309645, a command point sequence of rotation angles of a rotation axis in a machining program is approximated by a smooth curve (spline curve or non-uniform rational B-spline (NURBS) curve) and is corrected to command points along the curve.

However, because the command points in the machining program are corrected by a smooth approximation curve in the conventional technology, the position of a singular point changes depending on a set value of a tolerance width upon approximation of the curve, and the movement of the machine tool thereby largely changes.

Moreover, because the command points in the machining program are corrected, when the machining program is executed one block by one block, the machine tool does not stop at an original command position. Furthermore, because interpolation points between the command points in the machining program are obtained and then curve approximation is performed, expected curve approximation cannot sometimes be obtained.

SUMMARY OF THE INVENTION

It is an object of the present invention to at least partially solve the problems in the conventional technology.

According to an aspect of the present invention, there is provided a numerical control apparatus that numerically controls movement of a movable portion according to a machining program including commands for a tool-tip position determined by a position of a translation axis and for a tool posture determined by a rotation angle of a rotation axis. The numerical control apparatus includes an analysis processor that generates analysis data required to determine interpolation points for each of the translation axis and the rotation axis based on result of analyzing an instruction for each block commanded from the machining program; an interpolation processor that performs interpolation based on the analysis data to obtain interpolation points for each of the translation axis and the rotation axis in each control cycle; a rotation-axis filtering processor that subjects an angle change amount between interpolation points between rotation angles of the rotation axis to a smoothing process according to a preset filter time constant; a translation-axis timing synchronization unit that synchronizes timing of rotation of the rotation axis subjected to the smoothing process and timing of movement of the translation axis; a coordinate transformation unit that transforms the tool-tip position into coordinates of a machine position of the translation axis, from each tool-tip position after timing synchronization between axes of the translation axis is performed and from each rotation angle of the rotation axis subjected to the smoothing process; and an acceleration/deceleration processor that performs an acceleration/deceleration process on the machine position of the translation axis of which coordinates are transformed and on the rotation angle of the rotation axis subjected to the smoothing process.

According to another aspect of the present invention, there is provided a numerical control method including smoothing an angle change amount between interpolation points between rotation angles of a rotation axis in a machine tool so that a change amount of a tool posture per unit time becomes smooth; adjusting timing of rotation of the rotation axis after being smoothed and timing of movement of a translation axis in the machine tool so that an error with respect to a command path decreases; and transforming a tool-tip position into coordinates of a machine position of the translation axis from each tool-tip position after timing synchronization between axes of the translation axis is performed and from each rotation angle of the rotation axis after being smoothed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a numerical control apparatus and a numerical control method according to the present invention are explained in detail below with reference to the accompanying drawings. It is noted that the present invention is not limited to the embodiments.

Figure 1:
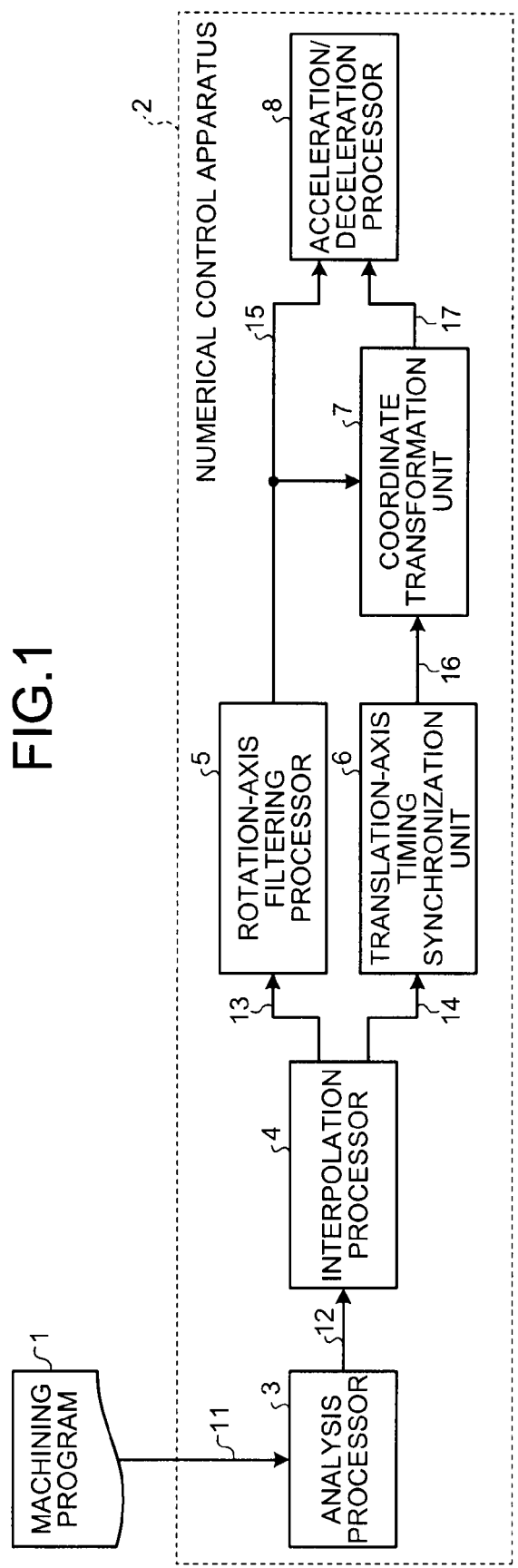
FIG. 1 is a block diagram of a schematic configuration of a numerical control apparatus according to a first embodiment of the present invention.

FIG. 1 is a block diagram of a schematic configuration of a numerical control apparatus 2 according to a first embodiment of the present invention. The numerical control apparatus 2 can numerically control movement of a movable portion according to a machining program 1 including a command 11 for a tool-tip position and a tool posture. It is noted that the tool-tip position can be determined by a position of a translation axis of a machine tool (not shown), and the tool posture can be determined by a rotation angle of a rotation axis of the machine tool.

The numerical control apparatus 2 can perform a smoothing process on an angle change amount between interpolation points between rotation angles of the rotation axis of the machine tool so that a change amount of a tool posture per unit time varies smoothly. Moreover, to reduce an error with respect to the commanded path, timing of rotation of the rotation axis after the smoothing process and timing of movement of the translation axis are adjusted, and then a machine position of the translation axis can be obtained from each tool-tip position after timing synchronization between axes of the translation axis is performed and from each rotation angle of the rotation axis after the smoothing process.

Specifically, the numerical control apparatus 2 includes an analysis processor 3 that analyzes an instruction for each block commanded from the machining program 1, an interpolation processor 4 that performs interpolation to obtain a moving amount for each axis in each control cycle, a rotation-axis filtering processor 5 that subjects an angle change amount of the rotation axis to a smoothing process, a translation-axis timing synchronization unit 6 that adjusts timing of rotation of the rotation axis and timing of movement of the translation axis, a coordinate transformation unit 7 that transforms the tool-tip position into coordinates of a machine position of the translation axis, and an acceleration/deceleration processor 8 that performs an acceleration/deceleration process on the machine position of the translation axis and on the rotation angle of the rotation axis. The machining program 1 including the command 11 for the tool-tip position and the tool posture is input to the numerical control apparatus 2 from a storage unit (not shown) or from an external device, and is output to the analysis processor 3. The analysis processor 3 creates analysis data 12 based on the result of analysis of the instruction for each block commanded from the machining program 1, and outputs the created data to the interpolation processor 4.

The interpolation processor 4 calculates a moving amount for each axis in each control cycle from the analysis data 12, generates interpolation points 13 between rotation angles of the rotation axis and interpolation points 14 between tool-tip positions of the translation axis, and outputs the interpolation points 13 to the rotation-axis filtering processor 5 and outputs the interpolation points 14 to the translation-axis timing synchronization unit 6. The rotation-axis filtering processor 5 subjects an angle change amount between interpolation points 13 between rotation angles of the rotation axis to moving average filtering according to a filter time constant previously given by parameters or the like for the machine tool, to thereby smooth the angle change amount between the interpolation points 13, and outputs rotation angles 15 of the rotation axis after being filtered to the coordinate transformation unit 7 and to the acceleration/deceleration processor 8.

Meanwhile, the translation-axis timing synchronization unit 6 subjects a moving amount between interpolation points 14 between tool-tip positions of the translation axis to moving average filtering according to the filter time constant of the rotation axis used to smooth the angle change amount between the interpolation points 13, to thereby synchronize the timing of the rotation of the rotation axis after the smoothing process and the timing of the movement of the translation axis, and outputs tool-tip positions 16 after the timing synchronization between axes of the translation axis is performed, to the coordinate transformation unit 7. The coordinate transformation unit 7 transforms the tool-tip positions into coordinates of a machine positions 17 of the translation axis according to the configuration of the machine tool, from each tool tip position 16 after the timing synchronization between axes of the translation axis is performed and from the rotation angles 15 of the rotation axis after being filtered. The acceleration/deceleration processor 8 performs an acceleration/deceleration process based on both the machine positions 17 and the rotation angles 15. The acceleration/deceleration processor 8 outputs a position on and a rotation angle around each axis after the acceleration/deceleration process is performed to a servo controller (not shown). As a result, a movable portion of each axis (not shown) is driven as desired.

As explained above, according to the embodiment, even when the machining program includes the command to intermittently change a tool posture or even when the machining program includes the command with which a change amount of a tool posture per unit time is not smooth and discontinuous, it is possible to smoothly move the tool tip by adjusting the filter time constants, improve the quality of machining, improve the manufacturing yield, and reduce environmental load in the machining process without changing the command points in the machining program by performing the smoothing process on the angle change amount between interpolation points between rotation angles of the rotation axis of the machine tool.

Besides, because the command points in the machining program are not changed, it is possible to prevent the change of the position of the singular point without depending on the set value of the filter time constant, to stop the machine tool at the original command position, and to prevent the change of movement of the machine tool.

Moreover, even when the angle change amount between interpolation points between rotation angles of the rotation axis of the machine tool is subjected to the smoothing process, an error with respect to the command path can be reduced by synchronizing the timing of rotation of the rotation axis subjected to the smoothing process and the timing of movement of the translation axis, and degradation of the machining precision can thereby be minimized.

Figure 2:
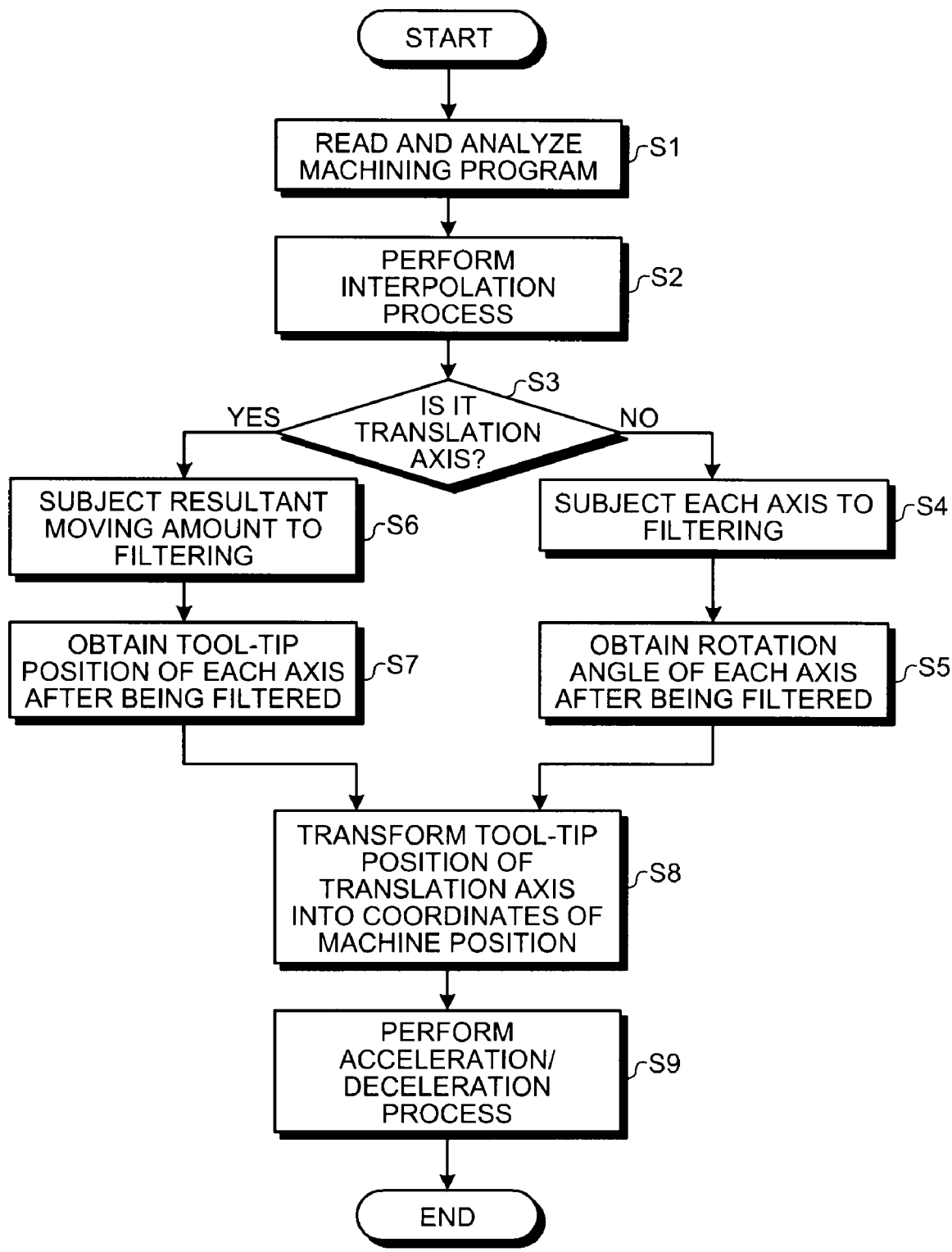
FIG. 2 is a flowchart of a filtering procedure performed by the numerical control apparatus according to the first embodiment.

FIG. 2 is a flowchart of an example of a procedure performed by the numerical control apparatus 2. At Step S1, the analysis processor 3 reads the machining program 1 including the command 11 for a tool-tip position and a tool posture one block by one block, analyzes an instruction for each command block, and creates analysis data 12 required to determine interpolation points for each axis. The analysis data 12 can include information required to define the movements of the machine tool such as a start point and an end point of each axis of the translation axis for determining a tool-tip position for each command block, a start point and an end point of each axis of the rotation axis for determining a tool posture, path information from the start points to the end points, and a movement path and a movement speed such as a command feed speed.

Next, at Step S2, the interpolation processor 4 performs an interpolation process on the analysis data 12 to obtain a moving amount for each axis in each control cycle. The interpolation process can be performed in the same manner as that of the conventional technology, and thus, detailed explanation thereof is omitted. The interpolation process can be performed in a different manner as that performed in the conventional technology. At Step S3, the interpolation processor 4 determines whether the axis for which the interpolation process is being performed is the translation axis. When the axis is the rotation axis (NO at Step S3), the interpolation processor 4 outputs the interpolation points 13 between rotation angles of the rotation axis to the rotation-axis filtering processor 5. Meanwhile, when the each axis is the translation axis (YES at Step S3), the interpolation processor 4 outputs the interpolation points 14 between tool-tip positions of the translation axis to the translation-axis timing synchronization unit 6. At Step S4, the rotation-axis filtering processor 5 subjects the angle change amount between the interpolation points 13 to the moving average filtering according to the filter time constant previously given by parameters or the like for the machine tool, to smooth the change amount of the tool posture per unit time.

Figure 3:
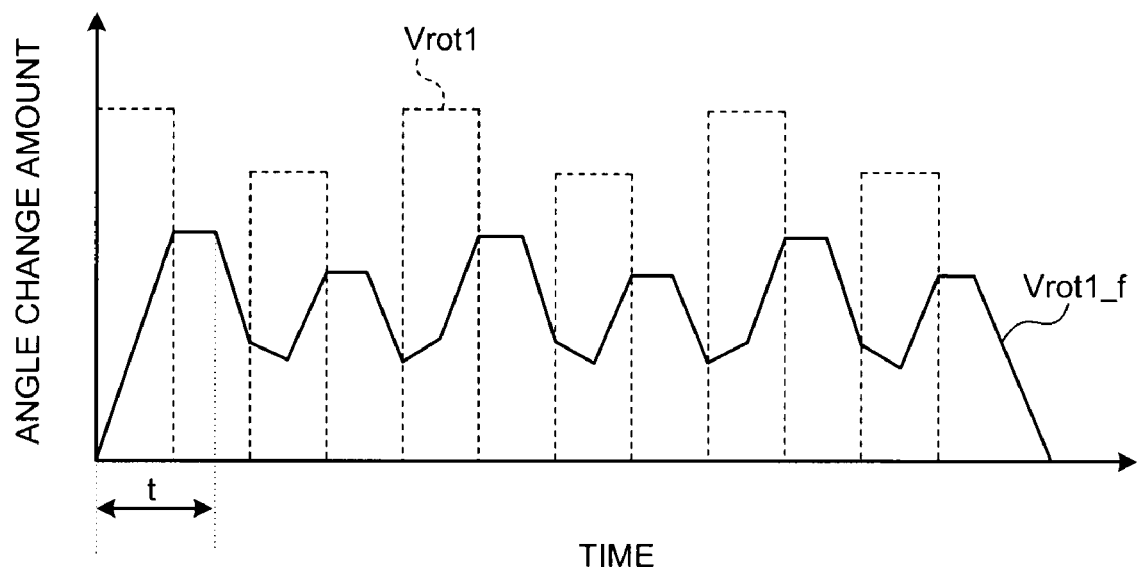
FIG. 3 is a waveform indicating a change amount of a tool posture when a command to intermittently change the tool posture is included in a machining program of the numerical control apparatus according to the first embodiment.

FIG. 3 is a waveform indicating a change amount of a tool posture (angle change amount) when a command to intermittently change the tool posture is included in the machining program 1. When the command to intermittently change the tool posture is included in the machining program 1, an angle change waveform Vrot1 of the rotation axis before being subjected to the moving average filtering has an intermittent shape. By subjecting the angle change waveform Vrot1 to the moving average filtering according to a filter time constant t, a continuously changed angle change waveform Vrot1_f of the rotation axis can be obtained as shown in FIG. 3.

Figure 4:
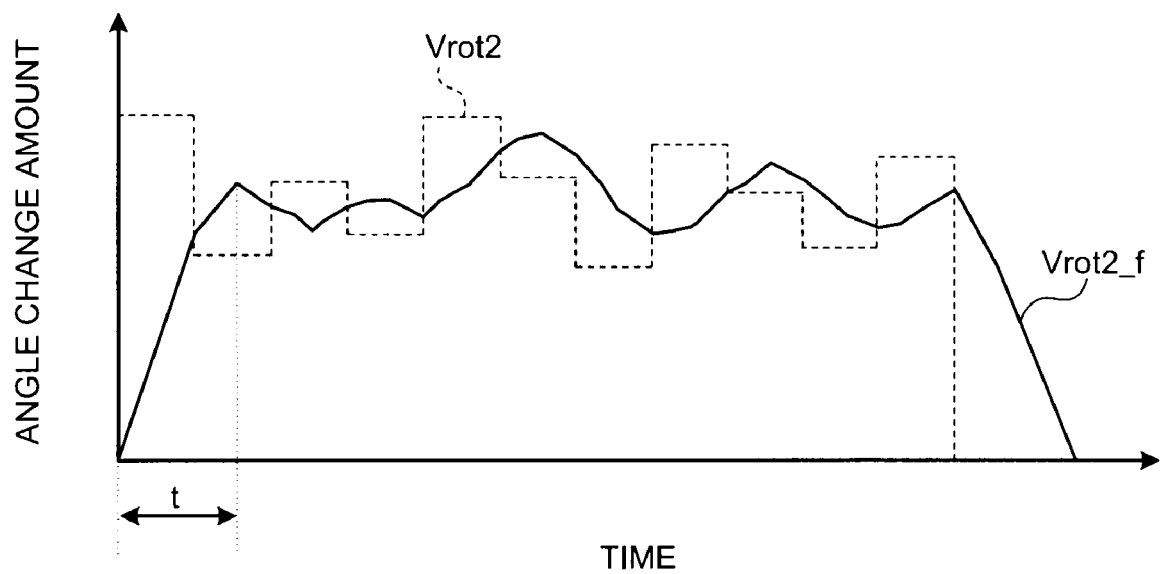
FIG. 4 is a waveform indicating a change amount of a tool posture when a command with which a change amount of the tool posture per unit time is not smooth and discontinuous is included in the machining program of the numerical control apparatus according to the first embodiment.

FIG. 4 is a waveform indicating a change amount of a tool posture when a command with which a change amount of the tool posture per unit time is not smooth and discontinuous is included in the machining program 1. When the command with which the change amount of the tool posture per unit time is not smooth and discontinuous is included in the machining program 1, an angle change waveform Vrot2 of the rotation axis before being subjected to the moving average filtering has a discontinuous shape. By subjecting the angle change waveform Vrot2 to the moving average filtering according to the filter time constant t, a continuously changed angle change waveform Vrot2_f of the rotation axis can be obtained as shown in FIG. 4.

Next, at Step S5, the rotation-axis filtering processor 5 accumulates angle change amounts of axes of the rotation axis subjected to the moving average filtering, to obtain each rotation angle 15 of the axes of the rotation axis after being filtered. Meanwhile, at Step S6, the translation-axis timing synchronization unit 6 calculates a resultant moving amount of the translation axis from moving amounts of the axes of the translation axis generated by the interpolation processor 4 and subjects the resultant moving amount of the translation axis to the moving average filtering according to a filter time constant the same as the filter time constant of the rotation axis, so that the timing of rotation of the rotation axis and the timing of movement of the translation axis are synchronized. Then, the translation-axis timing synchronization unit 6 re-distributes the resultant moving amount of the translation axis after being filtered, to each moving amount of the axes of the translation axis so as to follow the command path.

Next, at Step S7, the translation-axis timing synchronization unit 6 accumulates the re-distributed moving amounts of the axes of the translation axis, to obtain each tool-tip position 16 after the timing synchronization between the axes of the translation axis is performed. At Step S8, the coordinate transformation unit 7 transforms the tool-tip position into coordinates of each machine position 17 of the axes of the translation axis according to the configuration of the machine tool, from each tool-tip position 16 after the timing synchronization between the axes of the translation axis is performed obtained by the translation-axis timing synchronization unit 6 and from each rotation angle 15 of the axes of the rotation axis after being filtered obtained by the rotation-axis filtering processor 5.

Next, at Step S9, the acceleration/deceleration processor 8 performs an acceleration/deceleration process using the each obtained machine position 17 and the each obtained rotation angle 15. It is noted that the coordinate transformation process and the acceleration/deceleration process can be performed in the same manner as those of the conventional technology, and thus detailed explanation thereof is omitted. The acceleration/deceleration process can be performed in a different manner as that performed in the conventional technology.

Figure 5A:
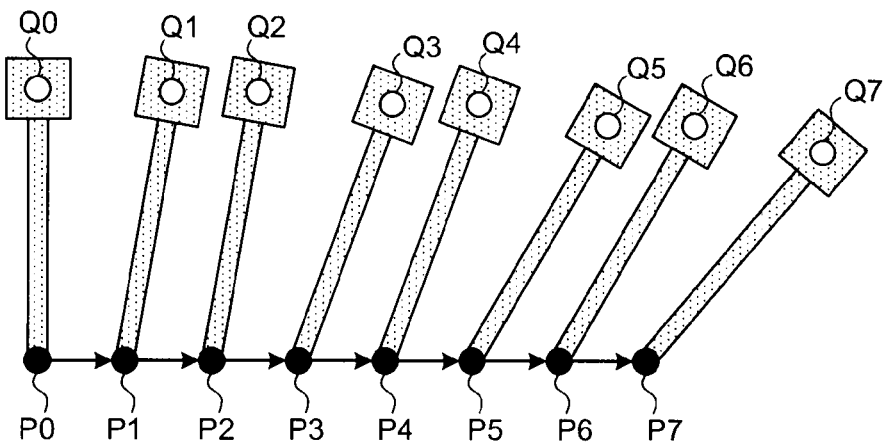
FIG. 5A is a schematic for explaining the movement of a tool when a command to intermittently change a tool posture is included in a machining program of the conventional numerical control apparatus.
Figure 5B:
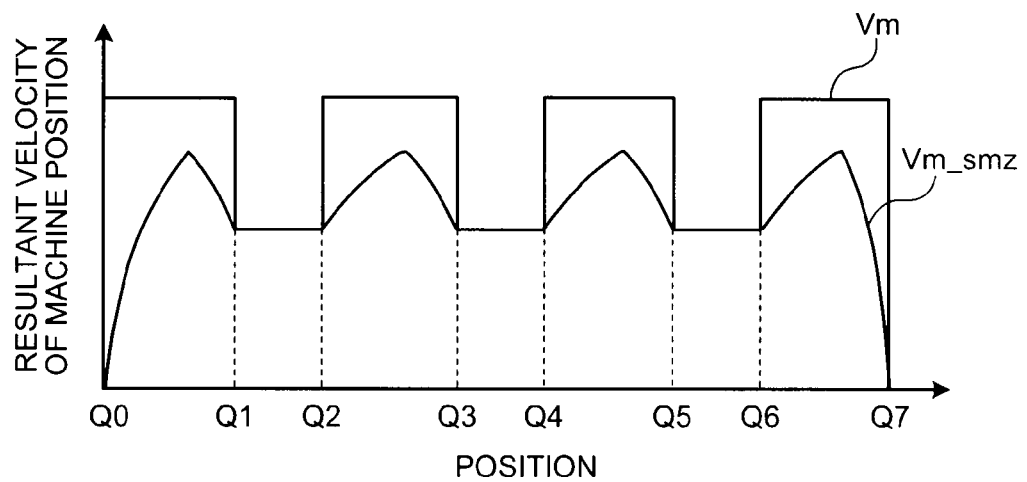
FIG. 5B is a resultant velocity waveform of machine positions Q0 to Q7 in FIG. 5A.
Figure 5C:
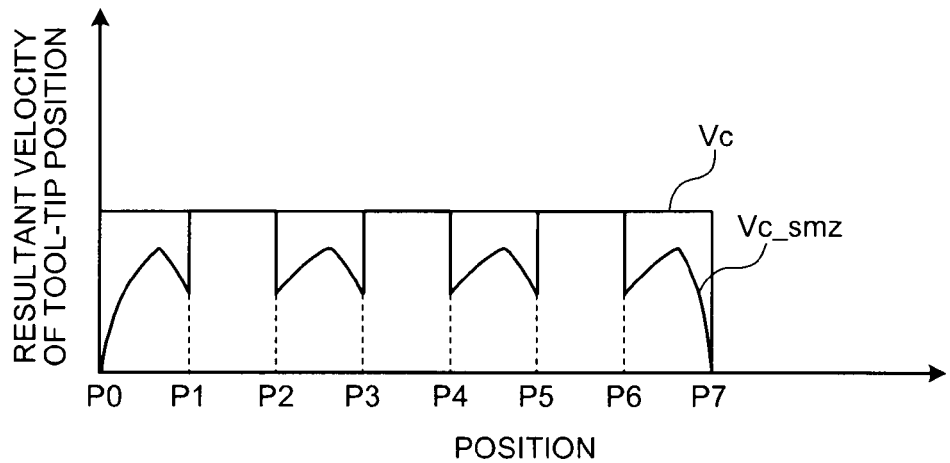
FIG. 5C is a resultant velocity waveform of tool-tip positions P0 to P7 in FIG. 5A.

FIGS. 5A to 5C are schematics for explaining movement of the tool when a command to intermittently change a tool posture is included in a machining program in the conventional numerical control apparatus. Specifically, FIG. 5A is a schematic of the tool, in which P0 to P7 represent tool-tip positions and Q0 to Q7 represent machine positions (center of rotation of the tool). FIG. 5B is a resultant velocity waveform of the machine positions, and FIG. 5C is a resultant velocity waveform of the tool-tip positions. In the conventional numerical control apparatus, as shown in FIG. 5A, it is clear that the tool posture is intermittently changed in such a manner that each moving amount between two points of the tool-tip positions P0 to P7 is constant, and the tool posture is changed between the machine positions Q0 to Q1, the tool posture is not changed between the machine positions Q1 to Q2, and the tool posture is changed between the machine positions Q2 to Q3.

In this case, as shown in FIG. 5B, a resultant command velocity Vm of the machine positions is different depending on whether the tool posture is changed, and thus the resultant command velocity Vm becomes discontinuous. In this case, to move the tool-tip positions P0 to P7 at a constant velocity, the movable portion is simply caused to move along the resultant command velocity Vm. However, to move the movable portion along the resultant command velocity Vm, the movable portion needs to be moved at discontinuous velocity. If the movable portion is caused to move at the discontinuous velocity, the machine tool vibrates or the machine tool cannot follow commands, and thus the acceleration/deceleration process is performed in the numerical control apparatus. Consequently, as shown in FIG. 5B, the machine positions Q0 to Q7 move at a resultant velocity Vm_smz after being accelerated and decelerated, and as shown in FIG. 5C, the tool-tip positions P0 to P7 move at a resultant velocity Vc_smz after being accelerated and decelerated. This results in repetition of acceleration and deceleration at a lower velocity than a resultant command velocity Vc of the tool-tip positions.

Figure 6A:
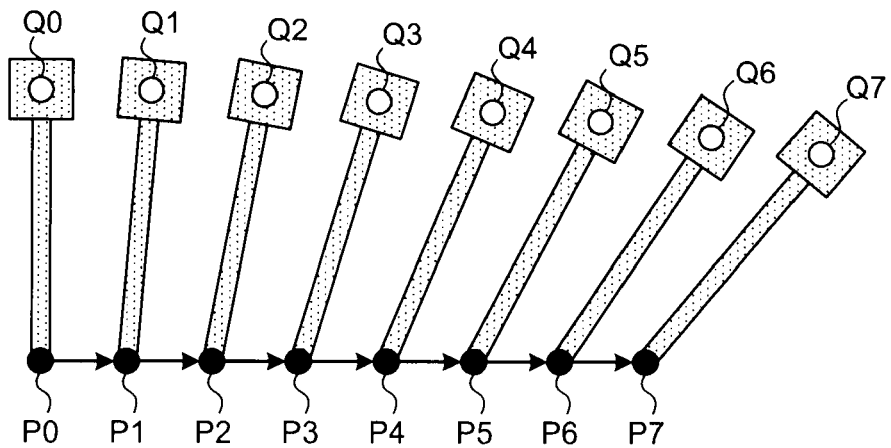
FIG. 6A is a schematic for explaining the movement of the tool when the command to intermittently change a tool posture is included in the machining program of the numerical control apparatus according to the first embodiment.
Figure 6B:
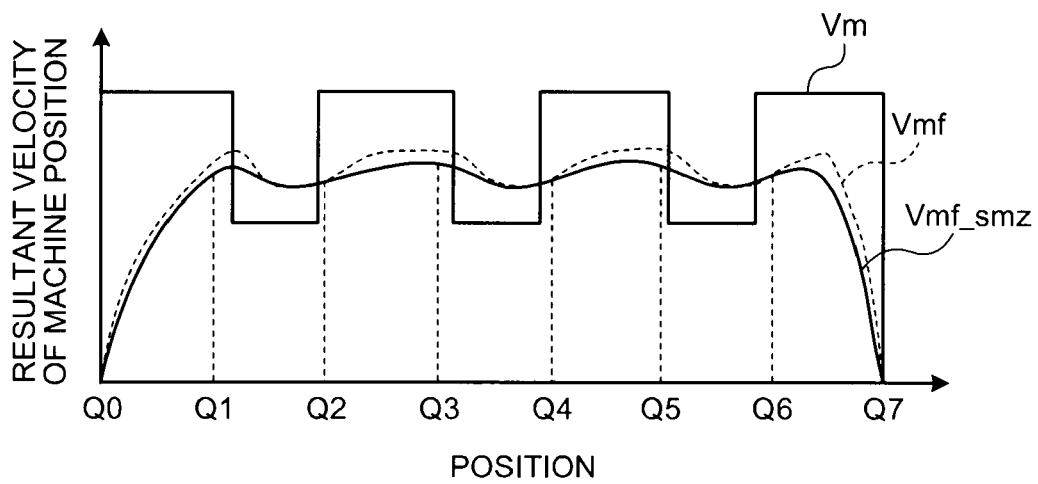
FIG. 6B is a diagram of a resultant velocity waveform of machine positions Q0 to Q7 in FIG. 6A.
Figure 6C:
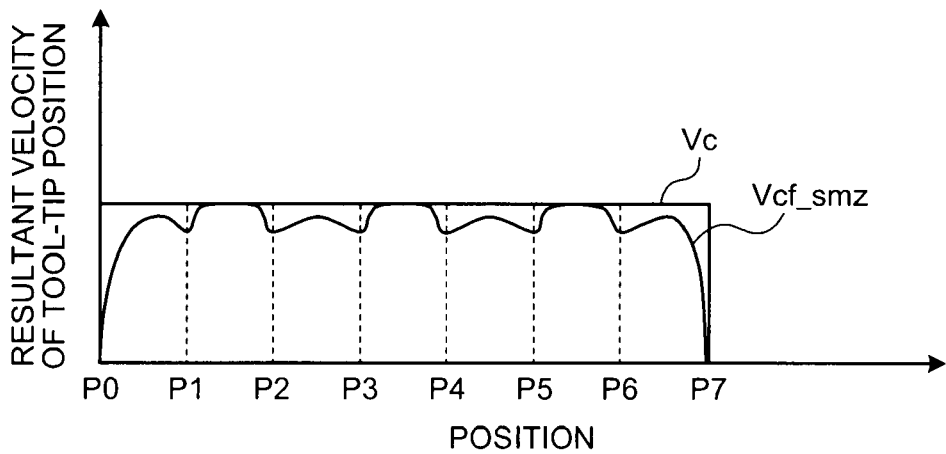
FIG. 6C is a diagram of a resultant velocity waveform of tool-tip positions P0 to P7 in FIG. 6A.

FIGS. 6A to 6C are schematics for explaining movement of the tool when a command to intermittently change a tool posture is included in a machining program in the numerical control apparatus 2. Specifically, FIG. 6A is a schematic of the tool, in which P0 to P7 represent tool-tip positions and Q0 to Q7 represent machine positions (center of rotation of the tool). FIG. 6B is a resultant velocity waveform of the machine positions, and FIG. 6C is a resultant velocity waveform of the tool-tip positions. As shown in FIG. 6A, the rotation-axis filtering processor 5 subjects each angle change amount of each axis of the rotation axis to the moving average filtering, which allows the tool posture not to be changed intermittently but to be continuously changed.

Consequently, as shown in FIG. 6B, a resultant command velocity Vmf of the machine positions Q0 to Q7 after being filtered can change more smoothly than the resultant command velocity Vm of the machine positions Q0 to Q7 before being filtered. Thus, even if the acceleration/deceleration process is performed on the machine positions Q0 to Q7, a resultant command velocity Vmf_smz of the machine positions Q0 to Q7 after being accelerated and decelerated can almost follow the resultant command velocity Vmf. Therefore, as shown in FIG. 6C, a resultant velocity Vcf_smz of the tool-tip positions P0 to P7 after being accelerated and decelerated can be brought close to the resultant command velocity Vc.

As shown in FIGS. 6B and 6C, the resultant velocity waveforms slightly wave, however, by adjusting the filter time constant according to the first embodiment and the filter time constant used in the acceleration/deceleration process, the wave of the resultant velocity waveforms can be adjusted.

As explained above, according to the first embodiment, the angle change amount of each axis of the rotation axis is subjected to the moving average filtering, so that the change amount of the tool posture per unit time can be smoothed. Therefore, even if the command to intermittently change the tool posture is included in the machining program 1, or even if the command with which the change amount of the tool posture per timer unit is not smooth and discontinuous is included therein, the tip of the tool can be moved smoothly by adjusting the filter time constants without changing the command point sequence in the machining program 1, and this allows implementation of high-quality machining.

Moreover, according to the first embodiment, to synchronize the timing of rotation of the rotation axis and the timing of movement of the translation axis, the translation axis is also subjected to the moving average filtering using the filter time constant the same as that of the rotation axis, which allows decrease in an error with respect to the command path. Furthermore, in the translation axis, the moving average filtering is subjected not to the moving amount of each axis but to the resultant moving amount and the result is distributed to each moving amount of each axis so as to follow the command path, which allows further decrease in the error with respect to the command path.

In the first embodiment, a moving average filter is used as a low-pass filter, however, any smoothing filter that has a high-frequency cutoff characteristic can be used. For example, a multistage moving average filter, a primary delay filter, or a secondary delay filter may be used. Even these filters allow a smooth change amount of the tool posture per unit time, and thus, the same effect can be obtained. Furthermore, in the first embodiment, the moving amount (velocity) is subjected to the moving average filtering, however, even if positions along the command path are subjected thereto, the same effect can be obtained. If the positions along the command path are employed, the processes at Steps S5 and S7 in FIG. 2 can be omitted.

The first embodiment explains the method of subjecting the translation axis to low-pass filtering using the filter time constant of the translation axis the same as the filter time constant of the rotation axis, however, the filter time constant of the translation axis may be different from that of the rotation axis. Furthermore, if the rotation axis has two or more axes, different filter time constants may be used for each of the rotation axes. However, if different filter time constants are employed for the rotation axis and the translation axis, it is necessary to synchronize timing of rotation of the rotation axis and timing of movement of the translation axis to decrease an error with respect to the command path.

Figure 7:
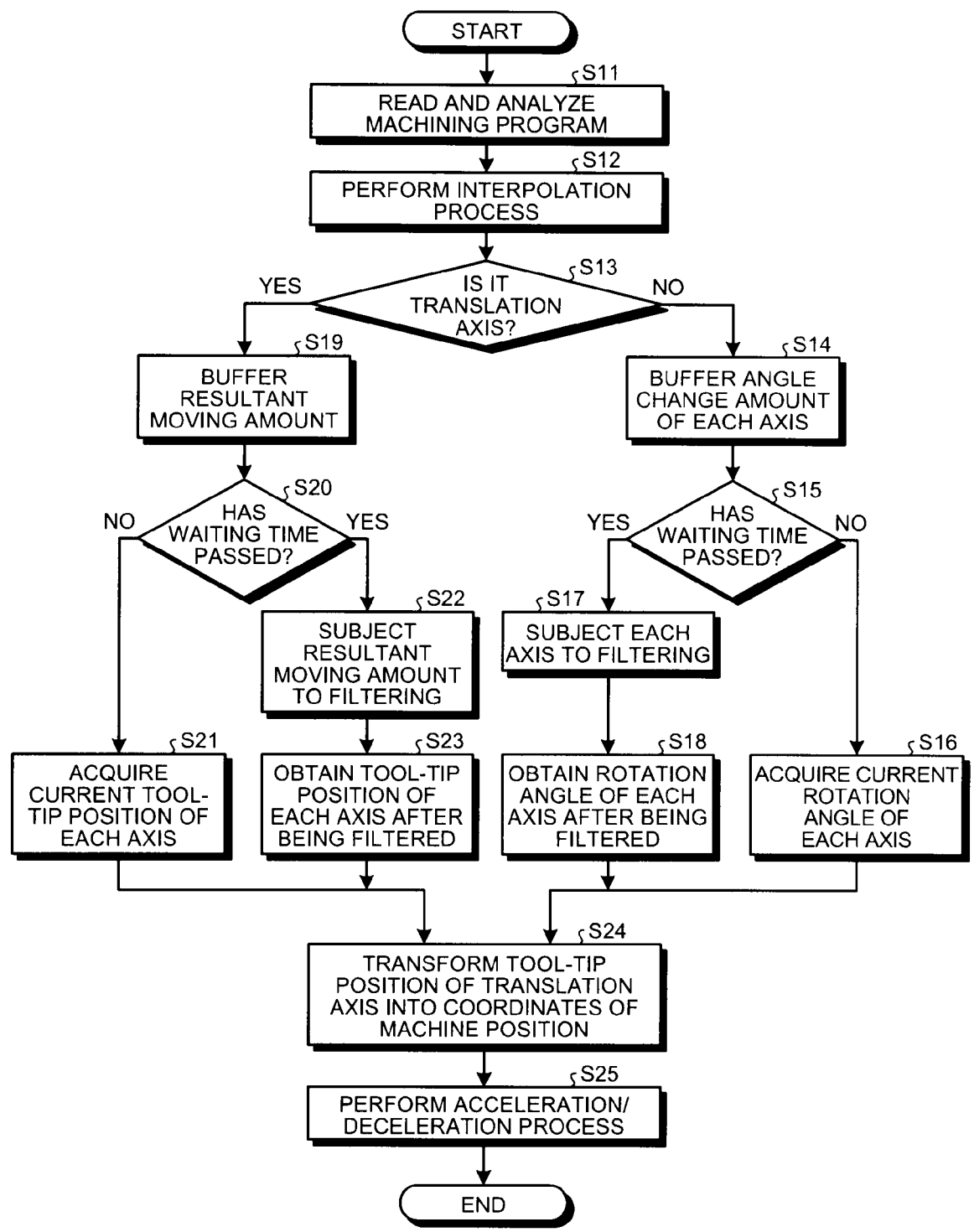
FIG. 7 is a flowchart of a timing synchronization procedure performed by a numerical control apparatus according to a second embodiment of the present invention.

FIG. 7 is a flowchart of an example of a procedure of a numerical control apparatus (not shown) according to a second embodiment of the present invention. It is noted that the same configuration as that of the numerical control apparatus 2 in FIG. 1 can be used for the numerical control apparatus according to the second embodiment. In FIG. 7, at Steps S11, S12, and S13, the same processes as these at Steps S1, S2, and S3 in FIG. 2 are performed, respectively. At Step S14, the rotation-axis filtering processor 5 in FIG. 1 buffers an angle change amount of each axis of the rotation axis obtained by the interpolation processor 4. Next, at Step S15, the rotation-axis filtering processor 5 determines whether each waiting time of each axis has passed. The waiting time of each axis can be set as half of the difference between a maximum time constant and its own time constant based on a filter time constant with the maximum set value, as a reference, among the filter time constants of the axes of the rotation axis and the filter time constant of the translation axis.

For example, a filter time constant of a first axis of the rotation axis is set to t1, a filter time constant of a second axis of the rotation axis is set to t2, and a filter time constant of the translation axis is set to t3, and t1 is assumed as the maximum value among them. In this case, because the first axis of the rotation axis has the maximum time constant, the waiting time of the first axis is 0, and a waiting time t21 of the second axis can be obtained by following Equation (1) and a waiting time t31 of the translation axis can be obtained by following Equation (2):

$$t21=(t1-t2)/2 \quad (1)$$

$$t31=(t1-t3)/2 \quad (2)$$

When it is determined at Step S15 that each waiting time of each axis has not passed, the process proceeds to Step S16, where current rotation angles of the axes of the rotation axis are obtained. Meanwhile, when it is determined at Step S15 that each waiting time of each axis has passed, the process proceeds to Step S17, where low-pass filtering is subjected to each angle change amount of the axes of the rotation axis buffered at Step S14, and the angle change amounts of the axes of the rotation axis are accumulated at Step S18, to obtain each rotation angle 15 of the axes of the rotation axis after being filtered. Meanwhile, at Step S19, the translation-axis timing synchronization unit 6 obtains a resultant moving amount of the translation axis from the moving amounts of the axes of the translation axis obtained by the interpolation processor 4, and buffers the resultant moving amount.

Next, at Step S20, the translation-axis timing synchronization unit 6 determines whether the waiting time t31 of the translation axis has passed. When it is determined at Step S20 that the waiting time t31 of the translation axis has not passed, the process proceeds to Step S21, where each current tool-tip position of the axes of the translation axis is obtained. Meanwhile, when it is determined at Step S20 that the waiting time t31 of the translation axis has passed, the process proceeds to Step S22, where low-pass filtering is performed on the resultant moving amount of the translation axis buffered at Step S19 and the moving amounts of the axes of the translation axis are accumulated at Step S23, to obtain each tool-tip position 16 after the timing synchronization between the axes of the translation axis is performed.

Subsequently, at Step S24, the coordinate transformation unit 7 transforms the tool-tip positions into coordinates of machine positions 17 of the axes of the translation axis according to the configuration of the machine tool, from the tool-tip positions of the axes of the translation axis obtained at Step S21 or Step S23 and from the rotation angles of the axes of the rotation axis obtained at Step S16 or Step S18. Next, at Step S25, the acceleration/deceleration processor 8 performs the acceleration/deceleration process using the obtained machine positions 17 of the axes of the translation axis and the obtained rotation angles of the axes of the rotation axis after being filtered. It is noted that the processes at Steps S24 and S25 in FIG. 7 are the same as these at Steps S8 and S9 in FIG. 2.

Figure 8A:
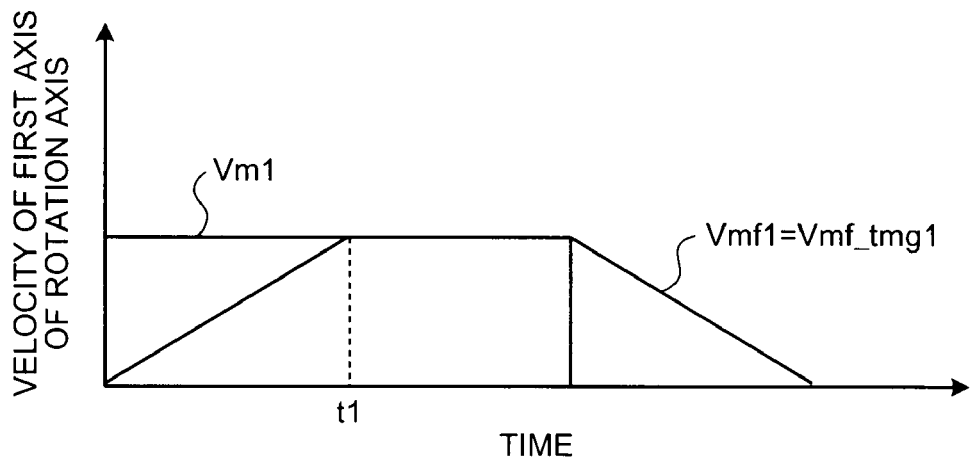
FIG. 8A is a velocity waveform of a first axis of a rotation axis in a timing synchronization process for a translation axis and the rotation axis in the numerical control apparatus according to the second embodiment.
Figure 8B:
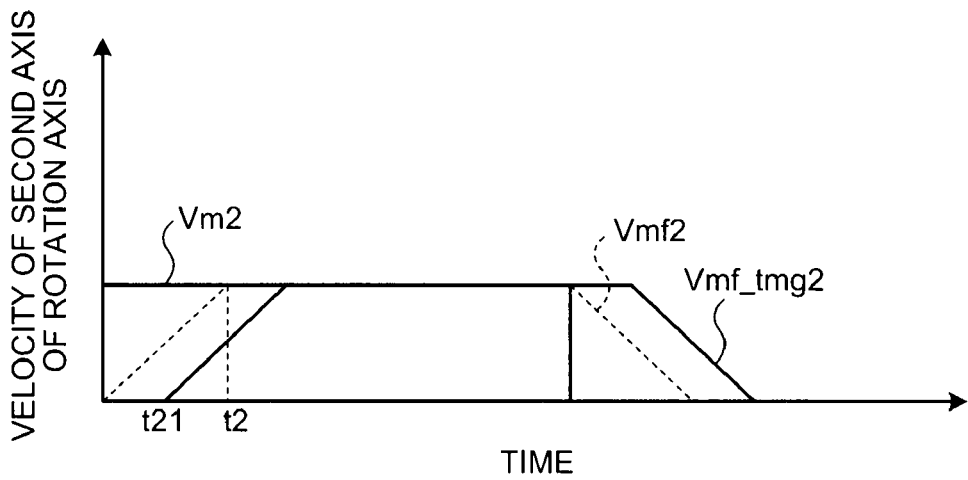
FIG. 8B is a velocity waveform of a second axis of the rotation axis in the timing synchronization process for the translation axis and the rotation axis in the numerical control apparatus according to the second embodiment.
Figure 8C:
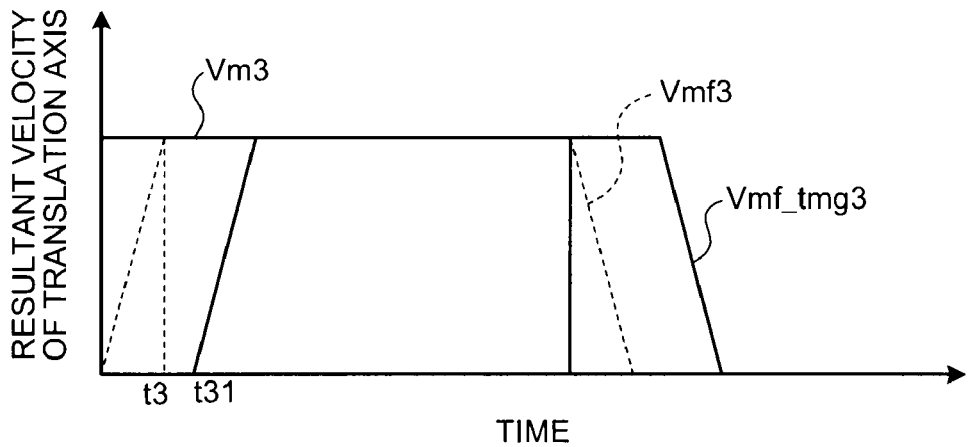
FIG. 8C is a resultant velocity waveform of the translation axis in the timing synchronization process for the translation axis and the rotation axis in the numerical control apparatus according to the second embodiment.

FIGS. 8A to 8C are diagrams for explaining a method of synchronizing timing of rotation of the rotation axis and timing of movement of the translation axis when the filter time constants of the axes of the rotation axis and the filter time constant of the translation axis are different from each other. Specifically, FIG. 8A is a velocity waveform of the first axis of the rotation axis, FIG. 8B is a velocity waveform of the second axis of the rotation axis, and FIG. 8C is a resultant velocity waveform of the translation axis. The filter time constant of the first axis is set to t1, the filter time constant of the second axis is set to t2, and the filter time constant of the translation axis is set to t3, and t1 is assumed as the maximum value among them.

As shown in FIG. 8A, when a command velocity waveform Vm1 of the first axis is given, a velocity waveform Vmf1 after the first axis is filtered before timing of rotation of the first axis is adjusted is obtained. Because the waiting time of the first axis is 0, a velocity waveform Vmf_tmg1 after the first axis is filtered and after the timing of rotation of the first axis is adjusted is generated at the same timing as that of the velocity waveform Vmf1, and the first axis starts to move without waiting time.

As shown in FIG. 8B, when a command velocity waveform Vm2 of the second axis is given, a velocity waveform Vmf2 after the second axis is filtered before timing of rotation of the second axis is adjusted is obtained. Because the waiting time of the second axis is t21, a velocity waveform Vmf_tmg2 after the second axis is filtered and after the timing of rotation of the second axis is adjusted is generated after being delayed by the waiting time t21 from the velocity waveform Vmf2, and the second axis starts to move after waiting the waiting time t21.

As shown in FIG. 8C, when a command velocity waveform Vm3 of the translation axis is given, a velocity waveform Vmf3 after the translation axis is filtered before timing synchronization between axes of the translation axis is performed is obtained. Because the waiting time of the translation axis is t31, a velocity waveform Vmf_tmg3 after the translation axis is filtered and after the timing synchronization between the axes of the translation axis is performed is generated after being delayed by the waiting time t31 from the velocity waveform Vmf3, and the translation axis starts to move after waiting the waiting time t31.

As explained above, according to the second embodiment, when the filter time constants of the rotation axes and the filter time constant of the translation axis are different from each other, a time constant with a maximum set value among all the filter time constants is set as a reference, and each movement is started after waiting a half time of a difference between the maximum time constant and its own time constant. It is thereby possible to synchronize the timing of the rotation of the rotation axis and the timing of the movement of the translation axis. Thus, even if the filter time constants of the rotation axis and the filter time constant of the translation axis are different from each other, by performing timing synchronization between the rotation of the rotation axis and the movement of the translation axis, an error with respect to the command path can be reduced.

Furthermore, according to the second embodiment, when the rotation axis include two or more axes, each axis is subjected to low-pass filtering using a discrete filter time constant for smoothing. Therefore, even if a plurality of rotation axes has different characteristics and different ways of commanding from the machining program, it is possible to implement high-quality machining, improve manufacturing yield, and reduce environmental load in the machining process.

According to an aspect of the present invention, even if the command to intermittently change a tool posture is provided or when the command with which a change amount of a tool posture is discontinuous is provided, machining can be implemented while the tip of the tool is smoothly moved without changing command points in the machining program.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A numerical control apparatus that numerically controls movement of a movable portion according to a machining program including commands for a tool-tip position determined by a position of a translation axis and for a tool posture determined by a rotation angle of a rotation axis, the numerical control apparatus comprising:
   an analysis processor that generates analysis data required to determine interpolation points for each of the translation axis and the rotation axis based on result of analyzing an instruction for each block commanded from the machining program;
   an interpolation processor that performs interpolation based on the analysis data to obtain interpolation points for each of the translation axis and the rotation axis in each control cycle;
   a rotation-axis filtering processor that subjects an angle change amount between interpolation points between rotation angles of the rotation axis to a smoothing process according to a preset filter time constant;
   a translation-axis timing synchronization unit that synchronizes timing of rotation of the rotation axis subjected to the smoothing process and timing of movement of the translation axis;
   a coordinate transformation unit that transforms the tool-tip position into coordinates of a machine position of the translation axis, from each tool-tip position after timing synchronization between axes of the translation axis is performed and from each rotation angle of the rotation axis subjected to the smoothing process; and
   an acceleration/deceleration processor that performs an acceleration/deceleration process on the machine position of the translation axis of which coordinates are transformed and on the rotation angle of the rotation axis subjected to the smoothing process.

2. The numerical control apparatus according to claim 1, wherein the rotation axis are in plurality, and the rotation-axis filtering processor subjects each of the rotation axes to low-pass filtering using separate filter time constants, to smooth angle change amounts each between interpolation points between rotation angles of each of the rotation axes.

3. The numerical control apparatus according to claim 1, wherein the translation-axis timing synchronization unit subjects a resultant moving amount obtained from moving amounts of the axes of the translation axis to low-pass filtering according to a filter time constant the same as the filter time constant of the rotation axis, and distributes an obtained value to each moving amount of the axes of the translation axis along a command path.

4. The numerical control apparatus according to claim 2, wherein when the filter time constants of the rotation axes and the filter time constant of the translation axis are different from each other, the translation-axis timing synchronization unit sets a filter time constant, as a reference, with a maximum set value among all the filter time constants, and starts moving the translation axis delayed by a time that is half of a difference between the maximum time constant and its own time constant, so that timing of rotation of the rotation axes and timing of movement of the translation axis are synchronized.

5. A numerical control method comprising:
   smoothing an angle change amount between interpolation points of a rotation axis by subjecting the angle change amount between interpolation points between rotation angles of the rotation axis in a machine tool to low-pass filtering according to a preset filter time constant so that a change amount of a tool posture per unit time becomes smooth;
   adjusting timing of rotation of the rotation axis after being smoothed and timing of movement of a translation axis in the machine tool by subjecting a moving amount between interpolation points between tool-tip positions of a translation axis to low-pass filtering according to the filter time constant so that an error with respect to a command path decreases; and
   transforming a tool-tip position into coordinates of a machine position of the translation axis from each tool-tip position after timing synchronization between axes of the translation axis is performed and from each rotation angle of the rotation axis after being smoothed.

* * * * *